(12) United States Patent
Hubbard et al.

(10) Patent No.: US 7,081,496 B2
(45) Date of Patent: *Jul. 25, 2006

(54) VIBRATION DAMPENING COMPOSITIONS AND METHODS THEREOF

(75) Inventors: Steven F. Hubbard, West Sand Lake, NY (US); Sai-Pei Ting, Slingerlands, NY (US)

(73) Assignee: General Electric Company, Pittsfield, MA (US)

( * ) Notice: Subject to any disclaimer, the term of this patent is extended or adjusted under 35 U.S.C. 154(b) by 246 days.

This patent is subject to a terminal disclaimer.

(21) Appl. No.: 10/301,487

(22) Filed: Nov. 21, 2002

(65) Prior Publication Data

US 2003/0125462 A1 Jul. 3, 2003

Related U.S. Application Data

(63) Continuation of application No. 09/592,702, filed on Jun. 13, 2000, now Pat. No. 6,521,704.

(51) Int. Cl.
*C08L 53/02* (2006.01)

(52) U.S. Cl. .............. 525/88; 525/92 R; 525/92 B; 525/92 E; 525/92 F

(58) Field of Classification Search ............ 525/88, 525/92 R, 92 B, 92 E, 92 F
See application file for complete search history.

(56) References Cited

U.S. PATENT DOCUMENTS

| | | |
|---|---|---|
| 3,770,560 A | 11/1973 | Elder et al. |
| 3,894,169 A | 7/1975 | Miller |
| 4,118,258 A | 10/1978 | Graveron et al. |
| 4,133,932 A | 1/1979 | Peck |
| 4,320,188 A | 3/1982 | Heinz et al. |
| 4,418,180 A * | 11/1983 | Heinz et al. ............ 525/314 |
| 4,419,494 A | 12/1983 | Puletti et al. |
| 4,495,240 A | 1/1985 | McCarthy |
| 4,740,427 A | 4/1988 | Ochiumi et al. |
| 4,826,933 A | 5/1989 | Grant et al. |
| 4,883,717 A | 11/1989 | Kitamura et al. |
| 4,887,788 A | 12/1989 | Fischer et al. |
| 4,987,194 A | 1/1991 | Maeda et al. |
| 5,008,324 A | 4/1991 | Killgoar, Jr. et al. |
| 5,066,708 A | 11/1991 | Koller, Sr. et al. |
| 5,122,578 A | 6/1992 | Han et al. |
| 5,162,156 A | 11/1992 | Troughton, Jr. et al. |
| 5,213,879 A | 5/1993 | Niwa et al. |
| 5,271,612 A | 12/1993 | Yada et al. |
| 5,281,667 A | 1/1994 | Khouri et al. |
| 5,350,610 A | 9/1994 | Mashita et al. |
| 5,886,094 A | 3/1999 | Sanada et al. |
| 6,221,968 B1 | 4/2001 | Atwood et al. |
| 6,521,704 B1 * | 2/2003 | Hubbard et al. ............ 525/64 |
| 2005/0027071 A1 * | 2/2005 | Deeter et al. ............ 525/67 |
| 2005/0273072 A1 * | 12/2005 | Hird et al. ............ 604/385.24 |
| 2005/0288402 A1 * | 12/2005 | Kosaka et al. ............ 524/90 |

* cited by examiner

*Primary Examiner*—Jeffrey Mullis

(57) ABSTRACT

The present invention relates to methods to improve the dampening characteristics of compositions and the improved compositions. The compositions made by the method comprises a polymer system selected from the group consisting of immiscible polymer blends, miscible polymer blends, copolymers, thermoplastic polymers and thermosetting polymers, and a block copolymer comprising: at least one block derived from aromatic vinyl units and at least one block derived from at least isoprene and a vinyl aromatic monomer and optionally butadiene, and having a glass transition temperature of at least 10° C.

29 Claims, 1 Drawing Sheet

VIBRATION DAMPENING COMPOSITIONS AND METHODS THEREOF

CROSS-REFERENCE TO RELATED APPLICATIONS

This is a continuation application of U.S. patent application Ser. No. 09/592,702 filed on Jun. 13, 2000 now U.S. Pat. No. 6,521,704.

BACKGROUND OF THE INVENTION

The invention relates to compositions having enhanced vibration dampening properties and methods to improve the vibration dampening properties of compositions.

The invention also relates to articles formed out of the compositions.

BRIEF DESCRIPTION OF THE RELATED ART

One relatively recent focus in the automobile industry has been the control and, preferably, the elimination of noise occurring as the result of the vibration of automobile body panels. To this end, important reductions in automobile noise levels have been achieved by the vibration damping of automobile body panels such as instrument panels, floor panels, door panels, roof panels, and fender panels, among others. To effectuate vibration damping, compositions containing fillers dispersed in binders have been widely used to coat metallic surfaces of automobile body panels to provide the desired vibration damping and/or sound deadening. For example, sheet materials of heat softenable compositions including asphalt, fillers and natural and/or synthetic elastomers have been used for sound deadening.

With the wide acceptance of plastic resins in the automobile industry for weight reduction, part consolidation, and recycle capability combined with the ever increasing demand for the increased noise management, there is a continuing need for new methods and compositions for noise control.

SUMMARY OF THE INVENTION

The needs discussed above have been generally satisfied by the discovery of a composition comprising:
(a) a polymer system selected from the group consisting of immiscible polymer blends, miscible polymer blends, copolymers, thermoplastic polymers and thermosetting polymers, and
(b) a block copolymer comprising:
    (i) at least one block derived from aromatic vinyl units and
    (ii) at least one block having a glass transition temperature of at least about 10° C. derived from at least isoprene and vinyl aromatic monomers, optionally with butadiene.

Component (b)(i) is preferably derived from at least one of styrene and α-methylstyrene and component (b)(ii) is preferably derived from at least one of styrene and α-methylstyrene combined with isoprene. The polymer system is preferably comprises at least one of polyphenylene ether resin, polyamide resin, polystyrene resin, poly(acrylonitrile-butadiene-styrene) resins, polycarbonate resin, and polyester resin.

In a preferred embodiment, the invention affords a method for enhancing the vibration dampening characteristics of composition, wherein the method comprises:
(a) a polymer system selected from the group consisting of immiscible polymer blends, miscible polymer blends, copolymers, thermoplastic polymers and thermosetting polymers, and
(b) a block copolymer comprising:
    (i) at least one block derived from aromatic vinyl units and
    (ii) at least one block having a glass transition temperature of at least about 10° C. derived from at least isoprene and vinyl aromatic monomers, optionally with butadiene.

Articles made from the improved compositions as well as articles that utilize the method for enhancing the vibration dampening characteristics are included within the scope of the invention. The description that follows provides further details regarding various embodiments of the invention.

DETAILED DESCRIPTION OF THE INVENTION

Figure 1:
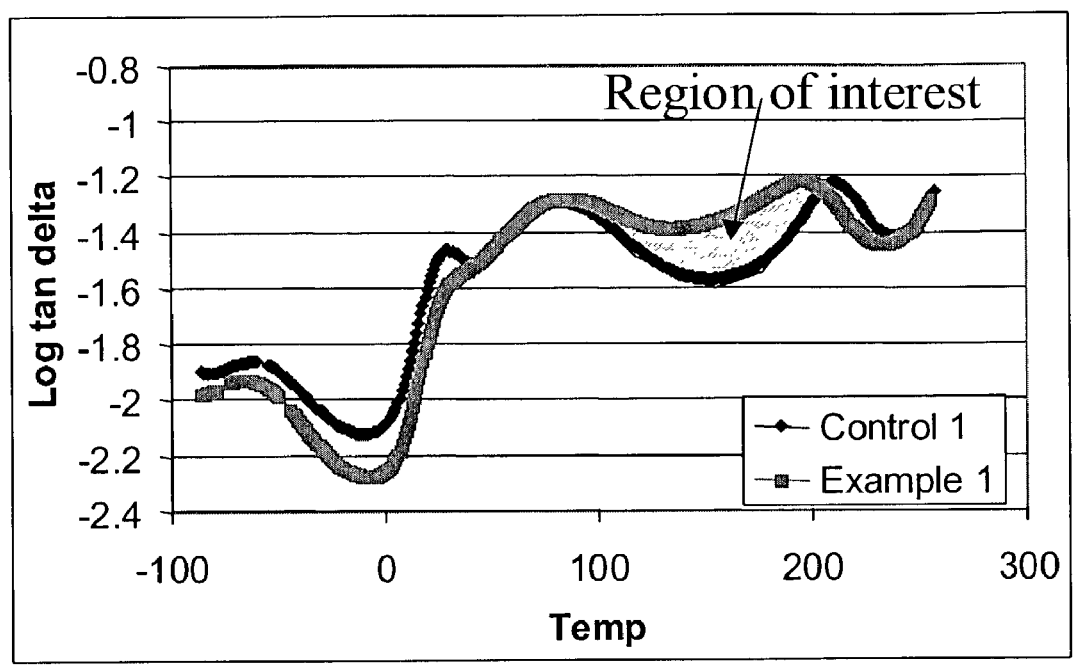
FIG. 1 contains a graphical depiction of the improved tangent delta using Example-2 from Table 1.

There is no limitation with respect to the immiscible polymer blends, miscible polymer blends, copolymers, thermoplastic polymers or thermosetting polymers (hereinafter all referred to as polymer systems) employed in this instant invention other than that they are able to form a composition with the block copolymer described above. Illustrative examples of the polymer blends that may be employed in this invention include any of those, for instance, which comprise polyphenylene ethers in combination with polyamides, polyolefins, polyarylene sulfides, polyesters, acrylonitrile butadiene styrene copolymers, polystyrenes, or polyetherimides. Polycarbonates in combination with poly(acrylonitrile-butadiene-styrene) resins or polyesters like poly(butylene terephthalate) may also be employed. The preferred thermoplastic polymers employed in this invention include homopolymers of polyarylene sulfides such as polyphenylene sulfide, polyetherimides, polysulfones including polyether sulfones, poly(acrylonitrile-butadiene-styrene) resins, polystyrene resins including rubber modified polystyrenes and syndiotactic polystyrenes, polycarbonates, e.g., bisphenol A polycarbonates, polyolefins, polyamides, polyesters such as poly(ethylene terephthalate) and poly(butylene terephthalate) as well as unfunctionalized polyphenylene ether homopolymers, unfunctionalized polyphenylene ether copolymers and functionalized polyphenylene ether homopolymers and copolymers. Especially preferred are (i) compositions containing at least one polyphenylene ether resin and at least one polyamide resin, and (ii) compositions containing at least one polyamide resin.

The thermosetting polymers are not limited and often include resins such as, for example, epoxy, phenolic, alkyds, polyester, polyimide, polyurethane, mineral filled silicone, bis-maleimides, cyanate esters, vinyl, and benzocyclobutene resins. The thermosetting components, such as those described above, may be used either alone or in combination with one another or with one or more thermoplastic polymers. In a preferred embodiment, the thermosetting polymer is used to impregnate suitable fibrous reinforcing materials, such as glass fiber cloth and/or chopped glass fibers, and/or various mineral fillers and reinforcing materials.

It is noted herein that any of the polymers employed in this invention, which are used to form the immiscible blends, miscible blends or copolymers, may be unfunctionalized or functionalized in the typical ways known in the art. Such functionalization is not limited and can include, for instance, functionalization with citric acid, maleic anhydride, fumaric acid, epoxides, trimellitic acid chloride anhydride, α- or β-unsaturated amides or lactams and the like provided that a polymer composition can be formed.

The polyphenylene ether polymers that may be employed in this invention often include both homopolymer and copolymer polyphenylene ethers. Suitable homopolymers are those which contain, for example, 2,6-dimethyl-1,4-phenylene ether units. Suitable copolymers include, for instance, graft, block, or random copolymers containing such units in combination with 2,3,6-trimethyl-1,4-phenylene ether units. Such polymer is typically prepared by oxidative coupling at least one corresponding monohydroxyaromatic compound. Moreover, any of the conventional polyphenylene ether impact modifiers/additives may be employed in this invention.

A preferred polymer systems that may be employed in this invention include those comprising polyphenylene ethers and polyamides, e.g., those containing at least one of polyamides 4/6, 6, 6/6, 11, 12, 6/3, 6/4, 6/10, 6/12 and nylon compounds comprising aromatic groups derived from terephthalates and isophthalates. They may be produced by any conventional method satisfactorily employed in the art. Generally, however, melt blending methods are desired. It is generally preferred for the polyphenylene ether to be in a dispersed phase within the polyamide phase. A more detailed and typical description of the production of polyphenylene ether/polyamide polymer systems that may be employed in this invention is described in U.S. Pat. Nos. 4,826,933 and 5,886,094, the disclosures of which are incorporated herein by reference.

Additionally, it is noted herein that the polyamides are intended as an embodiment of the present invention. Typical polyamides employed include polyamides 4/6, 6, 6/6, 11, 12, 6/3, 6/4, 6/10, 6/12 and nylon compounds comprising aromatic groups derived from terephthalates and isophthalates. Also included are reinforced polyamides, e.g., those containing glass fibers and/or mineral reinforcing agents.

Still other preferred polymer systems which may be employed in this invention include those comprising polyphenylene ether and polyesters. Such polymer systems are typically prepared by melt blending polyphenylene ethers with polyesters such as poly(ethylene terephthalate), poly(butylene terephthalate), liquid crystalline polyesters, poly(butylene naphthalenedicarboxylate) and poly(ethylene naphthalenedicarboxylate). A typical process for such is described in detail in U.S. Pat. No. 5,281,667, the disclosure of which is incorporated herein by reference.

Additional preferred polymer systems that may be employed in this invention include those that comprise polyphenylene ethers and polyarylene sulfides such as polyphenylene sulfide. Such polymer systems are prepared, for instance, by the reaction of epoxy functionalized polyphenylene ether compositions with polyphenylene sulfide containing epoxide-reactive functional groups. A detailed description of such preparation may be found in U.S. Pat. No. 5,122,578, the disclosure of which is incorporated herein by reference.

Additional preferred polymer systems that may be employed in this invention include those that comprise polyphenylene ethers and polyolefins, e.g., polypropylene or polyethylene. These compositions are known in the art as are their methods of preparation.

The block copolymers of the invention may be represented as having sequences of A-(BA)n or (AB)n, wherein A represents a block consisting of at least one aromatic vinyl monomer, B represent a block consisting of comprising isoprene and aromatic vinyl units, and n is an integer of one or more. There is no upper limit of n, but n is preferably 10 or less. When n is 1, the block copolymer is a tri-block A-B-A or a di-block A-B copolymer. Mixtures of block copolymers, e.g., mixtures of tri-block and di-block are also useful and in some instances preferred.

The first component of the block copolymers are anionic polymerizable aromatic vinyl monomers such as styrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene and the like, and more preferably styrene, α-methyl styrene, or mixtures thereof.

The second component of the block copolymers are polymerizable aromatic vinyl monomers in combination with isoprene or isoprene-butadiene. From the view of the dampening effect, the peak temperature of main variance of the tan delta (loss tangent) obtained by visco-elasticity measurement of this second component needs to be not less than about 25° C., preferably not less about 30° C., most preferably not less than about 35° C. When the peak temperature is less than about 25° C., sufficient dampening property is generally not obtained.

The polymerizable aromatic vinyl monomers include, e.g., styrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene and the like, and is preferably styrene, α-methyl styrene, or mixtures thereof.

The weight ratios of the polymerizable aromatic vinyl monomers, e.g., styrene, with isoprene or isoprene-butadiene can vary widely, provided that the glass transition temperature or Tg of the block in the copolymer is greater than 10° C., preferably greater than about 15° C., more preferably greater than about 20° C. In a preferred embodiment, the Tg of the block in the block copolymer is between 10° C. and about 80° C., preferably between about 15° C. and about 70° C. The polymerizable aromatic vinyl monomer content in the second component of the block copolymer is sufficient to increase the Tg to within the desired range yet is kept low enough for desirable elastomeric properties to remain in the block copolymer. For example, when a isoprene-butadiene combination is utilized in the absence of a polymerizable aromatic vinyl monomer, an isoprene content of less than about 40% by weight results in a Tg of less than about 0° C. A polymerizable aromatic vinyl monomer can be added as a comonomer to the same weight ratio of isoprene-butadiene to result in a Tg of at least 10° C., preferably of at least 15° C., with sufficient retention of other desired properties in the block copolymer. An exact amount of polymerizable aromatic vinyl monomer can be readily determined by the skilled artisan based upon the properties desired in the block copolymer without undue experimentation. In a preferred embodiment, the amount of polymerizable aromatic vinyl monomer in the second component of the block copolymer is less than about 40% by weight, preferably less than about 30% by weight of the isoprene or isoprene-butadiene utilized.

Any type of copolymerization structure of the monomers used in component b (ii), such as random, block, or tapered, can be applicable, although random is generally preferred. The carbon-carbon double bonds in the blocks containing isoprene or isoprene-butadiene units may be partially hydrogenated. The block copolymers composed of blocks in which a part of carbon-carbon double bonds are hydrogenated have the features of improved heat-resistance and weatherability. The hydrogenation rate may be selected according to the needs of heat-resistance and weatherability, normally 50% or more, preferably 70% or more, and more preferably 80% or more in the case of higher needs.

The number average molecular weight of the block copolymers is generally in the range of about 30,000 to about 300,000. When the molecular weight is less than 30,000, the block copolymers have inferior mechanical properties, such as tenacity and elongation at breakage. When the molecular weight is more than 300,000, the processability declines. From these points, the number average molecular weight of the block copolymers is preferably in the range of about 80,000 to about 250,000.

The number average molecular weight of aromatic vinyl block, i.e. component b (i) above, is generally in the range of about 2500 to about 50,000. When it is less than about 2500, the mechanical properties of the block copolymers decline, and when it is more than about 50,000, the melt viscosity becomes too high and the thermoplasticity is unfavorably degraded.

The proportion of aromatic vinyl blocks (component b (i)) in the block polymers is preferably 5 to 50% by weight. When the proportion is less than 5% by weight, the strength of the block copolymers becomes unsatisfactory, and when the proportion is more than 50% by weight, the processing becomes difficult due to an extreme increase in melt viscosity and the vibration-damping properties undesirably deteriorated. In a preferred embodiment, the proportion of aromatic vinyl blocks in the block polymers is preferably 15 to 35% by weight.

The number average molecular weight of component b(ii), the block comprising polymerized aromatic vinyl monomers with isoprene or isoprene-butadiene, is preferably in the range of 10,000 to 200,000. When the molecular weight is less than about 10,000, the block copolymers lose in rubber elasticity, and when the molecular weight is more than about 200,000, the block copolymers degrade in processability due to an extreme increase in melt viscosity.

The block copolymers can be obtained by methods generally known in the art such as copolymerization in an inert solvent using a lithium catalyst or Ziegler type catalyst, such as the methods described in U.S. Pat. No. 4,987,194.

The block copolymer is present in the compositions in amount effective to improve the dampening characteristics of the polymer blend system, preferably as measured by dynamic mechanical analysis at 10 Hz at temperatures in excess of about 100° C. It is often no more than about 40% by weight, i.e. between about 1 and 40% by weight, and preferably no more than about 30% by weight, i.e. between about 1 and 30% by weight, based upon the weight of the entire composition.

Compositions of the present invention can also include effective amounts of at least one additive selected from the group consisting of flame retardants, drip retardants, dyes, pigments, colorants, reinforcing agents, fillers, glass fibers, carbon fibers, carbon fibrils, stabilizers, antistatic agents, plasticizers and lubricants. These additives are known in the art, as are their effective levels and methods of incorporation. Effective amounts of the additives vary widely, but they are usually present in an amount from about 0.1% to 50% by weight, based on the weight of the entire composition.

The preparation of the compositions of the present invention is normally achieved by merely blending the ingredients under conditions for the formation of an intimate blend. Such conditions often include mixing in single or twin screw type extruders or similar mixing devices that can apply a shear to the components. It is often advantageous to apply a vacuum to the melt through a vent port in the extruder to remove volatile impurities in the composition.

All of the ingredients may be added initially to the processing system, or else certain additives may be precompounded with each other or with one of the primary components. In some embodiments certain properties, such as impact strength and elongation, are sometimes enhanced by initially utilizing such precompounding. While separate extruders may be used in the processing, these compositions may also be prepared by using a single extruder having multiple feed ports along its length to accommodate the addition of the various components. It is also sometimes advantageous to employ at least one vent port in each section between the feed ports to allow venting (either atmospheric or vacuum) of the melt. Those of ordinary skill in the art will be able to adjust blending times and temperatures, as well as component addition, without undue experimentation.

It should also be clear that improved molded articles prepared from the compositions of the present invention represent an additional embodiment of this invention.

All patents and references cited herein are hereby incorporated by reference.

The following examples are provided to illustrate some embodiments of the present invention. They are not intended to limit the invention in any aspect. All percentages are by weight based on the total weight of the entire composition unless otherwise indicated and all parts are parts by weight.

EXAMPLES

Exemplary conditions and procedures used in the manufacture of compositions of the present invention are as follows. The ingredients are compounded in a twin-screw extruder with temperature settings over the length of the extruder between about 280 and about 310° C. The screw speed is about 300 rpm, the throughput about 10 kilograms per hour. All polymeric ingredients are generally fed at the throat of the extruder with the glass fiber fed into a downstream port. The strands coming from the extruder are pelletized and dried for about 3 hours at about 110° C. The dried pellets are injection molded into standard ASTM test specimens for measurement of physical properties. Test specimens were evaluated with a Dynamic Mechanical Analyzer at 10 Hz to determine the dampening characteristics.

Illustrative compositions of the present invention generally contain the following materials and are provided as parts by weight:

PPE: a poly(2,6-dimethyl-1,4-phenylene ether) with an intrinsic viscosity of 40 ml/g as measured in toluene at 25° C. and a concentration of 0.6 gram per 100 ml;

Nylon 6,6: polyamide 6,6

CAH: citric acid hydrate

Glass: chopped glass fiber

VS-1 polystyrene-polyisoprene-polystyrene (A-B-A) block copolymer obtained from Kuraray Co., Ltd, under the tradename HYBRAR having a glass transition temperature, as determined by DSC at 10° C./min under nitrogen, of 8° C. and an endblock styrene content of 20 weight percent.

17° Tg block an A-(A/B)-A block copolymer having a glass transition temperature as determined by DSC at 10° C./min under nitrogen of 17° C. and an endblock styrene content of 20 weight percent.

34° Tg block an A-(A/B)-A block copolymer having a glass transition temperature, as measured as determined by DSC at 10° C./min under nitrogen of 34° C. and an endblock styrene content of 20 weight percent.

40° Tg block an A-(A/B)-A block copolymer having a glass transition temperature, as determined by DSC at 10° C./min under nitrogen of 40° C. and an endblock styrene content of 20 weight percent.

Dampening is characterized by a high value of tangent delta (E″/E′) as measured by dynamic mechanical analysis (DMA) and averaged over a range of temperatures. Table 1 shows the results utilizing higher-Tg block copolymers. The controls (C-1 and C-2) are materials exemplified U.S. Pat. No. 5,886,094 as compared to illustrative examples of the present invention utilizing higher Tg block copolymers. The higher Tg copolymers unexpectedly resulted in compositions having higher values of tangent delta at temperatures above 100° C. (E-1, E-2, E-3). This result is surprising because the Tg of the block copolymers is still well below 100° C. so one would not expect to see an effect above this temperature.

TABLE 1

|  | C-1 | C-2 | E-1 | E-2 | E-3 |
| --- | --- | --- | --- | --- | --- |
| PPE | 12 | 18 | 12 | 18 | 12 |
| Nylon 66 | 41.5 | 30.5 | 41.5 | 30.5 | 41.5 |
| Citric acid | 0.9 | 0.9 | 0.9 | 0.9 | 0.9 |
| VS-1 | 10 | 15 | 0 | 0 | 0 |
| 17° Tg block | 0 | 0 | 10 | 15 | 0 |
| 34° Tg block | 0 | 0 | 0 | 0 | 10 |
| Glass fiber | 34 | 34 | 34 | 34 | 34 |
| Tan delta*100 (20–60° C.) | 2.9 | 3.8 | 2.9 | 3.6 | 1.7 |
| Tan Delta*100 (60–100° C.) | 4.4 | 4.3 | 5 | 4.9 | 4.3 |
| Tan delta*100 (100–140° C.) | 3 | 3 | 4.4 | 5 | 4.6 |

It should be clear that in one embodiment, the invention provides a method to improve the dampening characteristics, as measured by tan delta using dynamic mechanical analysis at 10 Hz, over the temperature range of 100–140° C. of a composition by at least 10%, preferably by at least 20%, most preferably by at least 30%, with a block copolymer having a Tg of a least 10° C., preferably of at least 15° C., most preferably of at least 20° C., as described herein over the same composition using only a block copolymer having a Tg of less than 10° C.

In some cases, it may be advantageous to blend block copolymers having different Tg's. However, the effects of adding the combination of two or more block copolymers are different than those that would be expected from the results shown in Table 1. One would not expect adding relatively small amounts of a block copolymer having a Tg over 10° C. to a composition containing a block copolymer having a Tg lower than 10° C. to have a significant effect on tangent delta performance of the resultant composition over the temperature range of 100–140° C. However, as illustrated with the examples in Table 2 as compared to the controls C-1 and C-2, it was unexpectedly found that the higher Tg block copolymer can be added in amounts effective to increase the dampening characteristics over the desired 100–140° C. temperature range. These results are especially surprising as the dampening characteristics obtained in examples E-4 to E-6 in the temperature range below 100° C. was not improved over the controls C1 and C-2.

TABLE 2

|  | E-4 | E-5 | E-6 |
| --- | --- | --- | --- |
| PPE | 12 | 12 | 12 |
| Nylon 66 | 41.5 | 41.5 | 41.5 |
| Citric acid | 0.9 | 0.9 | 0.9 |
| VS-1 | 5 | 5 | 5 |
| 17° Tg block | 5 | 0 | 0 |
| 34° Tg block | 0 | 5 | 0 |
| 40° Tg block | 0 | 0 | 5 |
| Glass fiber | 34 | 34 | 34 |
| Tan delta*100 (20–60° C.) | 2.6 | 2.4 | 0.7 |
| Tan delta*100 (60–100° C.) | 4.1 | 4 | 3.9 |
| Tan delta*100 (100–140° C.) | 3.1 | 3.4 | 4.9 |

It should be clear that in one embodiment, the invention provides a method to improve the dampening characteristics, as measured by tan delta using dynamic mechanical analysis at 10 Hz, over the temperature range of 100–140° C. of a composition by at least 10%, preferably by at least 20%, most preferably by at least 30%, with a combination of block copolymers wherein at least one has a Tg of a least 10° C., preferably of at least 15° C., most preferably of at least 20° C. and at least one has a Tg of less than 10° C., as described herein over the same composition using only a block copolymer having a Tg of a less than 10° C.

This invention provides improved dampening as measured by DMA at 10 Hz over a range of temperatures. In particular, dampening is improved at temperatures above 100° C. This improvement is gained using block copolymers having a glass-transition temperature above 10° C.

The invention claimed is:

1. A composition comprising a blend of:
   (a) a polymer system selected from the group consisting of immiscible polymer blends containing polyamides, miscible polymer blends containing polyamides, and polyamides, and
   (b) a block copolymer comprising:
   (i) at least one block derived from aromatic vinyl units arid
   (ii) at least one block derived from at least isoprene and a vinyl aromatic monomer and having a glass transition temperature of at least 10° C.

2. The composition of claim 1, wherein the polymer system further comprises at least one of polystyrene resin, poly(acrylonitrile-butadiene-styrene) resins, polyetherimide resin, polysulfone resin, polycarbonate resin, and polyester resin.

3. The composition of claim 1, wherein the polymer system comprises a compatibilized composition of at least one polyphenylene ether resin and at least one polyamide resin.

4. The composition of claim 1, wherein the block copolymer is functionalized with at least one moiety selected from the group consisting of anhydride, epoxy, carboxylic acid, amino, ortho ester, oxazoline, and hydroxyl.

5. The composition of claim 1, wherein the block copolymer has a glass transition temperature of at least about 15° C.

6. The composition of claim 1, wherein component (b)(i) is derived from at least one of styrene and α-methylstyrene.

7. The composition of claim 1, wherein component (b)(ii) is derived from at least one of styrene and α-methylstyrene.

8. The composition of claim 1, wherein component (b)(ii) is derived from at least styrene and isoprene.

9. The composition of claim 1, wherein component (b)(ii) is further derived from butadiene.

10. The composition of claim 9, wherein component (b)(ii) is at least partially hydrogenated.

11. The composition of claim 1, wherein the block copolymer has a number average molecular weight between about 30,000 to about 300,000.

12. The composition of claim 1, further comprising at least one of glass fibers, carbon fibers, carbon fibrils, minerals, flame retardants, antioxidants, and lubricants.

13. The composition of claim 1, wherein the block copolymer is present in amount effective to improve the dampening characteristics of the polymer blend system as measured by dynamic mechanical analysis at 10 Hz.

14. The composition of claim 1, wherein the block copolymer is present in an amount effective to improve the dampening characteristics of the polymer blend system as measured by dynamic mechanical analysis at 10 Hz at temperatures in excess of about 100° C.

15. The composition of claim 1, wherein the block copolymer is present in an amount from about 1 percent by weight to about 30 percent by weight based on the weight of the entire composition.

16. The composition of claim 1, wherein the polyamide is functionalized with at least one moiety selected from the group consisting of citric acid, maleic anhydride, fumaric acid, epoxides, trimellitic acid anhydride, alpha- or beta-unsaturated amides and lactams.

17. The composition of claim 1, wherein component (b)(ii) has a tan delta, wherein a peak temperature of main variance of the tan delta is not less than about 25° C.

18. A composition comprising a blend of:
   (a) a polymer system comprising a thermosetting polymer, and
   (b) an A-(BA)$_n$ and/or an (AB)$_n$ block copolymer comprising:
      (i) as an A block, at least one block derived from aromatic vinyl units and
      (ii) as a B block, at least one block derived from at least isoprene and a vinyl aromatic monomer and having a glass transition temperature of at least 10° C.
   wherein n is an integer of one or more, and
   wherein the thermosetting polymer is functionalized with at least one moiety selected from the group consisting of citric acid, maleic anhydride, fumaric acid epoxides, trimellitic acid anhydride, alpha- or beta-unsaturated amides and lactams.

19. The composition of claim 18, wherein the polymer system further comprises at least one of polystyrene resin, poly(acrylonitrile-butadiene-styrene) resins, polyetherimide resin, polysulfone resin, polycarbonate resin, and polyester resin.

20. The composition of claim 18, wherein the polymer system comprises a compatibilized composition of at least one polyphenylene ether resin and at least one polyamide resin.

21. The composition of claim 18, further comprising at least one of glass fibers, carbon fibers, carbon fibrils, minerals, flame retardants, antioxidants, and lubricants.

22. The composition of claim 18, wherein the thermosetting polymer is selected from the group consisting of epoxy, phenolic, alkyds, polyester, polyimide, polyurethane, mineral filled silicone, bis-maleimides, cyanate esters, vinyl, and benzocyclobutene resins.

23. The composition of claim 18, wherein component (b)(ii) has a tan delta, wherein a peak temperature of main variance of the tan delta is not less than about 25° C.

24. An article molded from a composition comprising a blend of:
   (a) a polymer system comprising a thermosetting polymer, and
   (b) an A-(BA)$_n$ and/or an (AB)$_n$ block copolymer comprising:
      (i) as an A block, at least one block derived from aromatic vinyl units and
      (ii) as a B block, at least one block derived from at least isoprene and a vinyl aromatic monomer and having a glass transition temperature of at least 10° C.
   wherein n is an integer of one or more, and
   wherein the thermosetting polymer is functionalized with at least one moiety selected from the group consisting of citric acid, maleic anhydride, fumaric acid, epoxides trimellitic acid anhydride, alpha- or beta-unsaturated amides and lactams.

25. The article of claim 24, wherein the polymer system further comprises at least one of polystyrene resin, poly (acrylonitrile-butadiene-styrene) resins, polyetherimide resin, polysulfone resin, polycarbonate resin, and polyester resin.

26. The article of claim 24, wherein the polymer system comprises a compatibilized composition of at least one polyphenylene ether resin and at least one polyamide resin.

27. The article of claim 24, wherein the block copolymer is functionalized with at least one moiety selected from the group consisting of anhydride, epoxy, carboxylic acid, amino, ortho ester, oxazoline, and hydroxyl.

28. The article of claim 24, wherein the thermosetting polymer is selected from the group consisting of epoxy, phenolic, alkyds, polyester, polyimide, polyurethane, mineral filled silicone, bis-maleimides, cyanate esters, vinyl, and benzocyclobutene resins.

29. The article of claim 24, wherein component (b)(ii) has a tan delta, wherein a peak temperature of main variance of the tan delta is not less than about 25° C.

* * * * *